May 27, 1969

H. J. ZELIK 3,447,001

VERTICALLY ADJUSTABLE PORTABLE HANDTOOL WITH
ELECTRIC MOTOR AND HOUSING ASSEMBLY

Filed May 22, 1967

INVENTOR
HYNEK J. ZELIK

BY *Joseph R. Slotnick*

ATTORNEY

May 27, 1969

H. J. ZELIK 3,447,001

VERTICALLY ADJUSTABLE PORTABLE HANDTOOL WITH
ELECTRIC MOTOR AND HOUSING ASSEMBLY

Filed May 22, 1967

INVENTOR
HYNEK J. ZELIK

BY Joseph R. Slotnik

ATTORNEY

United States Patent Office 3,447,001
Patented May 27, 1969

3,447,001
VERTICALLY ADJUSTABLE PORTABLE HAND-TOOL WITH ELECTRIC MOTOR AND HOUSING ASSEMBLY
Hynek J. Zelik, Baltimore, Md., assignor to The Black and Decker Manufacturing Company, Towson, Md., a corporation of Maryland
Filed May 22, 1967, Ser. No. 640,029
Int. Cl. H02k 7/14
U.S. Cl. 310—50          15 Claims

ABSTRACT OF THE DISCLOSURE

A portable router comprising an electric motor with a rotatable output shaft coaxially connected to a tool bit through a collet secured to the shaft. The motor is encased within a housing and is cooled by a fan which rotates with the motor shaft. A flat base is secured to the housing to support the router upon a workpiece surface and the base and housing are adjustable longitudinally of the motor shaft to selectively position the tool bit for the desired depth of cut. A detachable cap covers the end of the housing remote from the tool bit and base and traps a power line cord and a control switch lever in place on the housing.

Summary of the invention

The present invention relates to a composite housing and cooling fan construction for universal electric motors having a stationary field and a rotatable armature, and includes a thin walled sleeve surrounding the motor field and which sleeve and field are sandwiched, axially, between front and rear housing members. An interconnecting member is detachably secured to the front housing member within the housing sleeve and is also secured to the rear housing member by means acting to draw the front and rear housing members axially against the housing sleeve. A motor cooling fan may rotate with a shaft forming part of the motor armature to draw cooling air axially through the motor. If desired, the fan may be of the "mixed flow" type in which case the interconnecting member covers part of the fan inlet side. This has the effect of increasing the suction effect at the fan and enhances the motor cooling effect thereof. The composite housing and cooling fan construction embodies efficiency, compactness, strength, simplicity in that it facilitates easy assembly and disassembly, and versatility in that different capacity motors can be employed therewith with a minimum of part change. Furthermore, air egress from the housing is such that it may be employed to blow chips, dust, etc. away from a tool bit associated with and driven by the motor shaft.

Main objects, therefore, of the present invention are to provide an improved, composite electric motor housing construction which minimizes the overall longitudinal and transverse motor dimensions, insures accurate disposition of the motor housing parts, embodies overall strength and rigidity and facilitates assembly and disassembly of the motor parts quickly and easily.

Additional important objects of the present invention are to provide an improved motor housing construction of the above character wherein the component parts interfit and align in a novel manner and which may have a highly efficient motor cooling fan construction integrated therewith.

Further important objects include the provision of an improved housing construction of the above character which is easily modified to accommodate different capacity motors with a minimum of structural change, and which is highly effective for use in portable tools, for example, routers.

Still further objects of the present invention are to provide an improved composite housing construction of the above character which is relatively inexpensive to manufacture, rugged in construction and reliable in use.

Other objects and advantages of the present invention will become more apparent from a consideration of the detailed description to follow taken in conjunction with the appended drawings.

Broad statement of the invention

Broadly described, the present invention relates to a universal electric motor of the type having a stationary field and an armature rotatable within said field, and includes that improvement which comprises a sleeve disposed in closely spaced, surrounding relation to said field, first and second housing members abuttingly engaging opposite ends of said sleeve, and together therewith defining a motor housing, an interconnecting member nesting with said first housing member, means detachably securing, said first housing member and said interconnecting member, and means connecting said second housing member and said interconnecting member and adapted to draw said first and second housing members toward each other and into tight engagement with said sleeve.

Detailed description

Figure 2:
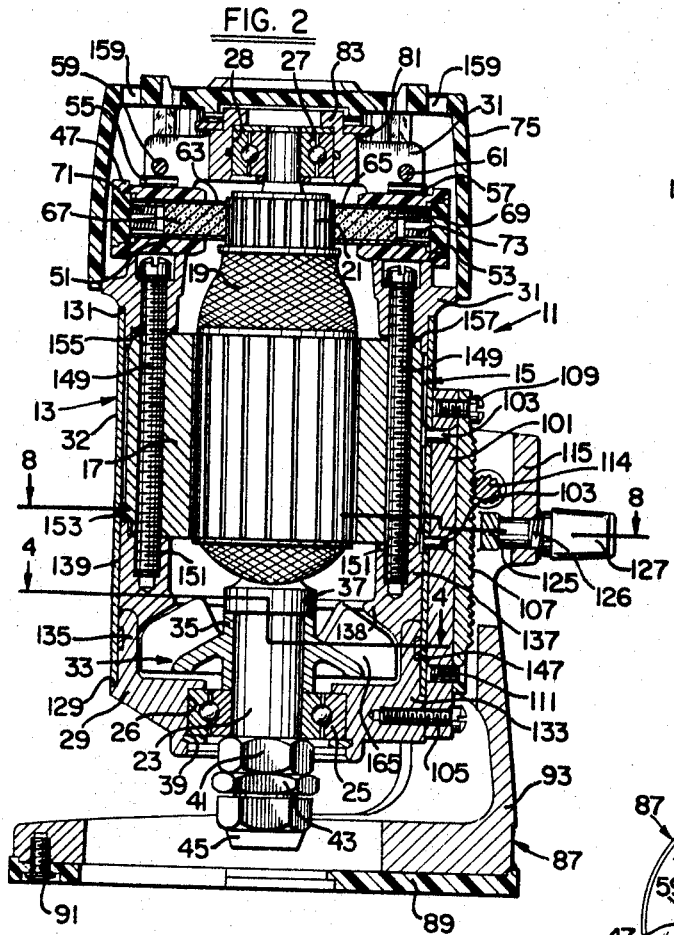
FIG. 2 is an enlarger, vertical sectional view of the structure of FIG. 1.
Figure 1:
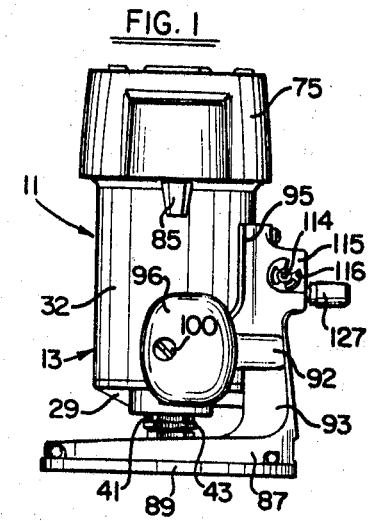
FIG. 1 is a side elevational view illustrating a router embodying the present invention.

Referring now more particularly to the drawings, the present invention is seen embodied in a router illustrated generally at 11 in FIGS. 1 and 2. However, it is to be understood that this tool is given by way of illustration only and that the present invention finds more general use in that class of electric motors and motor powered devices wherein strength, compactness, versatility and efficiency of the motor and motor housing are important factors.

With this in mind, the illustrated router 11 is seen to include a composite, generally cylindrical housing 13 having an electric motor 15 disposed therein. The motor 15 is powered from a suitable source connected therethrough by a line cord 79 and has a rotatable motor or armature shaft 23 extending outwardly of the housing 13 and adapted to have a tool bit (not shown) secured for rotation therewith by a collet disposed within a collet nut 45. An apertured base 87 supports the motor housing 13 for adjustment along the axis of the armature shaft 23 to correspondingly adjust the depth of cut of the tool bit (not shown).

The motor 15 includes a stationary field 17 and has armature windings 19 and a commutator 21 secured for rotation with the armature shaft 23 centrally of the field (FIG. 2). The shaft 23 is journaled fore and aft by bearings 25, 27 supported in socket openings 26, 28 formed in front and rear housing members 29, 31. A cylindrical sleeve 32 is trapped between the housing members 29, 31 and together therewith forms part of the housing 13. A motor cooling fan 33 has a mounting sleeve 35 slip fitted on the forward portion of the shaft 23 between a shoulder 37 and the bearing 25 and the latter is held in the socket opening 26 by a retaining ring 39. A collar 41 is keyed on the shaft 23 forwardly of the bearing 25. A lock nut 43 is threaded on the shaft 23 forwardly of the collar 41 and holds the latter in place on the shaft, and in addition, draws the collar 41 and the fan sleeve 35 tightly against the inner race of the bearing 25. The collet nut 45 is threaded on the forwardmost end of the shaft 23 and is adapted to chuck a suitable tool bit (not shown) to the shaft for conjoint rotation therewith as described briefly above.

A pair of brush holders 47, 49 are supported in pockets 51, 53 in the rear housing member 31 and are resiliently held in place therein by clip springs 55, 57 and pins 59, 61, respectively (FIG. 2). A pair of metal inserts 63, 65 are snugly fitted in the holders 47, 49 and slidably carry electrical brushes 67, 69, respectively, which are biased by compression springs 71, 73 outwardly of the holders 47, 49 and into engagement with the commutator 21. And insulating, plastic cap 75 covers the rear housing member 31 and prevents withdrawal of the pins 59, 61 and the cap is held in place by screws (not shown) which thread into the rear housing member. For a detailed explanation of the brush holder mounting and retainer construction, reference may be made to the copending application of Hynek J. Zelik et al., Ser. No. 641,692, filed May 26, 1967, and owned by the assignee of the present application. However, since this construction forms no part of the present invention, it is not described further here.

Figure 7:
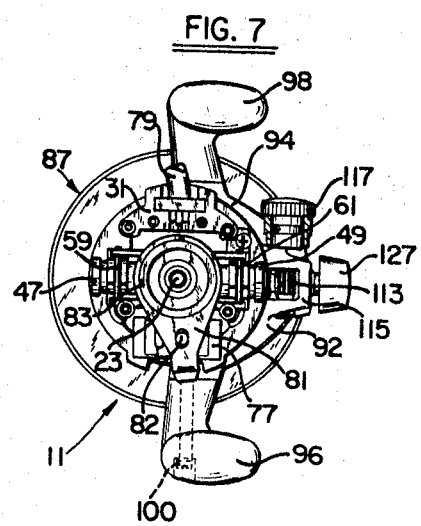
FIG. 7 is a top plan view of FIG. 1 shown with the housing cap removed.

The line cord 79 depends from the cap 75 and is connected to the brushes 67, 69 through a toggle switch 77 (FIG. 7). A switch lever 81 is piloted on a generally cylindrical boss 83 on the rear housing member 31 and is apertured to receive a toggle lever 82 forming part of the switch 77. The switch lever 81 has a finger knob 85 extending outwardly between the cap 75 and the rear housing member 31 so that when the lever 81 is turned to pivot the toggle lever 82 and close the switch 77, the motor 15 is energized and the shaft 23 rotates.

Figure 8:
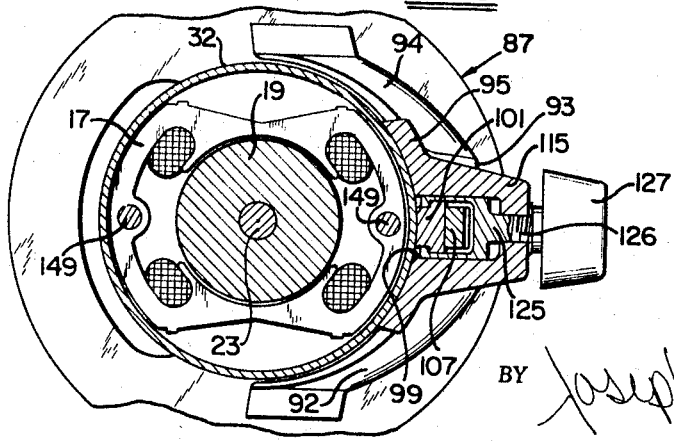
FIG. 8 is an enlarged sectional view of FIG. 2, taken along the line 8—8 thereof and shown with the handles removed.

The motor housing supporting base 87, as seen in FIGS. 1 and 2, has a work surface engaging subbase 89 fixed thereto by screws 91 and an integral upstanding leg 93 disposed adjacent the motor housing 13. A pair of arms 92, 94 extend laterally from the leg 93 and have knobs 96, 98, respectively, secured thereto by screws 100 to facilitate manual manipulation of the router tool 11 as is customary. The leg 93 also has an arcuate, upper portion 95 which is generally complementary to the outer surface of the cylindrical motor housing sleeve 32 and has an elongated, generally vertically extending slot 99 therein (FIG. 8). An elongated T-bar 101 is secured to the motor housing sleeve 32 by rivets or screws 103 and to the front housing member 31 by a screw 105 and is adapted to slide in the slot 99. A rack 107 is secured to the T-bar 101 by a fillister head screw 109 and a countersunk screw 111 and is engagable by a pinion 113 formed integral with or otherwise suitably secured to a shaft 114 which extends through and is rotatably supported by both legs of a generally U-shaped bracket 115 which is integral with the base leg upper portion 95 and bridges the slot 99 (see also FIGS. 2 and 7). One end of the shaft 114 has a retainer ring 116 thereon and the other has an enlarged knurled knob 117 which, when turned, rotates the pinion 113 and through engagement with the rack 107 adjusts the position of the motor housing 13 longitudinally or axially of the motor shaft 23 relative to the base 87. A generally C-shaped clamp 125 has a threaded post 126 rigid therewith and extending through the bracket 115. A clamping knob 127 is threaded on the post 126 and the clamp 125 is adapted to engage behind the T-bar 101 so that by threading the knob 127 on the post 126, the clamp 125 pulls outwardly on the T-bar 101 and locks the motor housing 13 relative to the base 87. When it is desired to adjust the housing 13 and base 87, the knob 127 is loosened and the knurled knob 117 turned.

In a number of electric motor powered devices of this type it is desirable that the overall radial and axial dimensions of the motor 15 be minimized. In addition, some of these devices, like the illustrated router 11, operate at very high speeds and therefore develop relatively high motor temperatures during use and require relatively high volume cooling air flow therethrough. The compact nature of the motor and motor housing inhibits air flow therethrough so that the capacity of the cooling air fan must be relatively high if the motor is not to overheat excessively.

According to the present invention, the motor housing sleeve 32, forming part of the composite motor housing 13, is relatively thin walled and is disposed in closely spaced, surrounding relation to the motor field 17. The housing sleeve 32 is sandwiched, axially, between the front and rear housing members 29, 31 by engaging annular, external shoulders 129, 131 formed on the members 29, 31, respectively. The front housing member 29 has an annular portion 133 which fits snugly into the motor housing sleeve 32 and the portion 133 has a plurality of angularly spaced fingers 135 projecting rearwardly therefrom. An interconnecting member 137 has an annular portion 139 also fitting snugly within the motor housing sleeve 32 which annular portion 139 has a plurality of angularly spaced fingers 141 projecting forwardly therefrom. The fingers 135, 141 are adapted to neatly interfit so that the front housing 29 and the member 137 nest as shown in FIG. 2. The fingers 135, 141 have grooves 143, 145 in the outer surfaces thereof, respectively, which align and form a substantially continuous annular groove, which when the fingers 135, 141 are interfitted, is adapted to receive a split ring or flexible band 147 to hold the front housing 29 and the member 137 together. The motor housing sleeve traps the split ring 147 in place in the grooves 143, 145 and the rear housing 31 is secured in place by axial screws 149 which extend therethrough and through the field 17 and are threaded into bosses 151 in the member 137. When the screws 149 are drawn up tight, the motor housing sleeve 32 is axially compressed between the front and rear housing shoulders 129, 131 and is therefore strengthened against deflection. In addition the member 137 and the rear housing 31 are provided with opposed, annular sockets 153, 155 which receive the field 17 and accurately position it laterally relative to the motor housing sleeve 32 so that the sleeve 32 and the field 17 are spaced throughout their length to permit unobstructed flow of cooling air therebetween. Wavy washers 157 surround the screws 149 and are within the socket 155 to prevent the field 17 from rattling during tool operation.

It will be appreciated that in the event it is desired to employ a different capacity motor, such may be accomplished by increasing or decreasing the stackings in the field 17. Inasmuch as the motor housing 13 is concerned, this necessitates only a different motor housing sleeve 32 while the other housing components, including the front and rear housing members 29, 31 and the member 137 may be retained. This of course contributes greatly to the overall versatility of the novel motor housing assembly.

Figure 4:
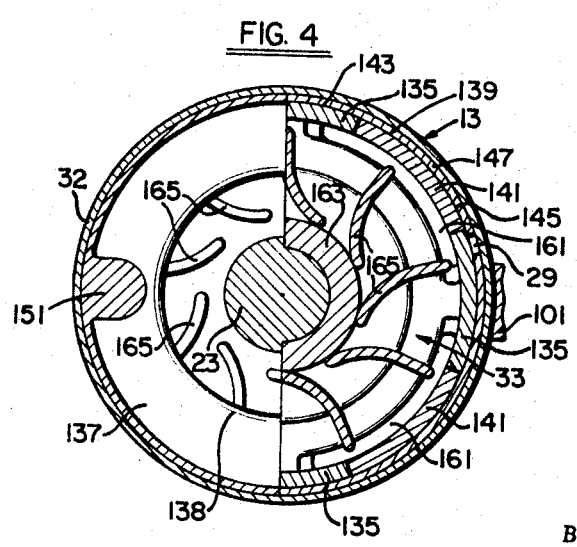
FIG. 4 is an enlarged sectional view of FIG. 2 taken along the line 4—4 thereof.
Figure 3:
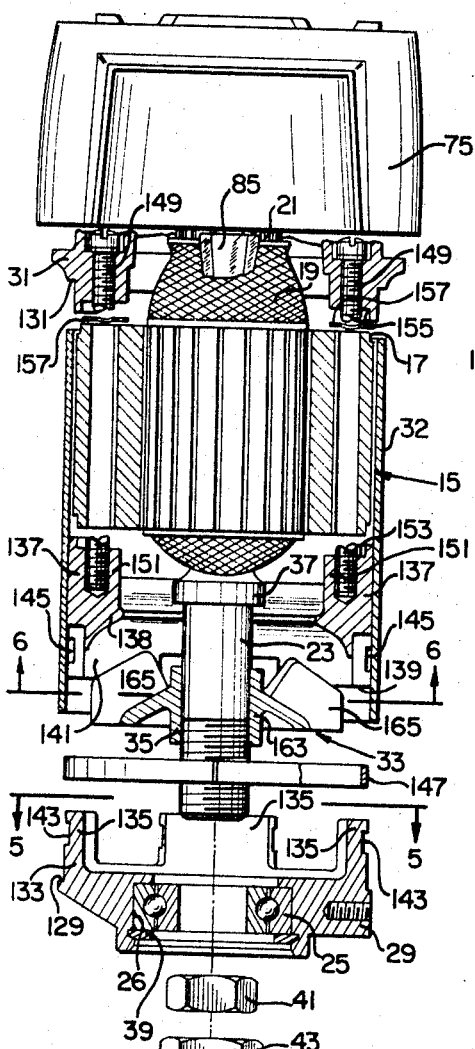
FIG. 3 is an exploded view of the structure of FIG. 2, shown with the cap in elevation and with the base removed for clarity.
Figure 5:
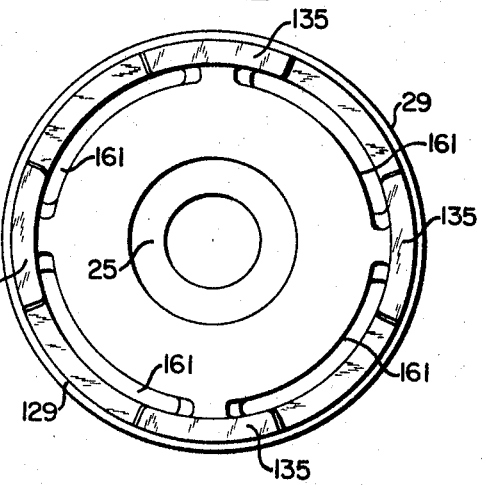
FIG. 5 is an enlarged plan view of the front housing member taken along the line 5—5 of FIG. 3 and looking in the direction of the arrows.
Figure 6:
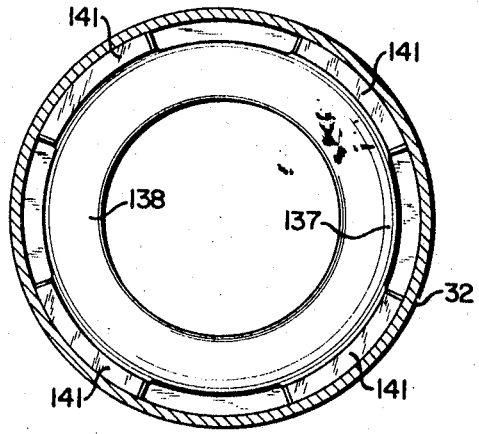
FIG. 6 is a sectional view of FIG. 3 taken along the line 6—6, with the fan and armature shaft removed and illustrating the baffle.

The motor cooling fan 33 is positioned between the front housing 29 and the member 137 and is adapted to draw cooling air through inlet openings 159 in the cap 75, axially between the housing sleeve 32 and the field 17 and between the motor armature windings 19 and the field 17, and discharges it through apertures 161 in the end of the front housing 29. The fan 33 can be of the axial flow type wherein air is drawn into and discharged therefrom in a direction parallel to the fan rotational axis. However, as described above, it is desirable that a relatively large volume of cooling air be drawn through the motor in motor devices such as in the illustrated router 11. To this end, the illustrated fan is of the "mixed flow" centrifugal type having an impeller 163 and blades 165 adapted to draw air axially into the blades 165 and discharge it therefrom at an acute angle to the axis of rotation of the fan. Where the "mixed flow" fan 33 is used, the member 137 has baffle webbing 138 which overlays a portion of the inlet side of the fan blades 165, as shown best in FIGS. 2 and 4, so that the exposed diameter of the fan blades at the inlet side is substantially less than that at the discharge side thereof. The suction developed by a centrifugal fan is proportional to the ratio of the outlet diameter to the inlet diameter so that cooling air is rapidly drawn through the restricted area between the field 17 and the armature windings 19. In addition, by providing the discharge apertures 161 at the end of the front housing 29, the discharged air impinges against the workpiece around the tool bit (not shown) and blows chips, dust, etc., formed by the bit, away.

By the foregoing, there has been disclosed an improved electric motor housing and cooling fan construction calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

I claim:

1. In a universal electric motor of the type having a stationary field and an armature rotatable within said field, that improvement which comprises a sleeve disposed in closely spaced, surrounding relation to said field, first and second housing members abuttingly engaging opposite ends of said sleeve and together therewith defining a motor housing, an interconnecting member nesting within said first housing member, means detachably securing said first housing member and said interconnecting member, and means interconnecting said second housing member and said interconnecting member and adapted to draw said first and second housing members toward each other into tight engagement with said sleeve.

2. A construction as defined in claim 1 wherein said first housing member and said interconnecting member include interfitting portions having aligned groove means formed in the outer surfaces thereof, said detachable securing means comprising means positionable in said groove means, said sleeve being adapted to retain said detachable securing means in said groove means.

3. A construction as defined in claim 2 wherein said interfitting portions define a generally cylindrical outer surface, said groove means defining an annular groove, said detachable securing means comprising a split ring fitting into said annular groove, and said sleeve being generally cylindrical in cross section and fitting snugly over said interfitting portions.

4. A construction as defined in claim 1 wherein said first housing and said interconnecting member include angularly spaced, interfitting fingers, aligned groove means in the outer surface of said fingers and receiving a flexible band, said sleeve being closely fitted over said interfitting fingers and confining said flexible band in said groove means.

5. A construction as defined in claim 4 which includes screw means extending through said second housing member internally of said sleeve and threaded into said interconnecting member.

6. A construction as defined in claim 1 which includes a mixed flow fan rotatable with said armature and disposed adjacent said first housing member, said fan being adapted to draw cooling air through said motor and discharge it through openings in said first housing member, and wherein said interconnecting member includes a baffle overlaying a portion of the inlet side of said fan.

7. A construction as defined in claim 6 wherein said discharge openings are formed in the outer end of said first housing member, said armature including a shaft adapted to drive a tool bit, said discharge openings permitting dispersion of chips from around said tool bit.

8. A construction as defined in claim 1 wherein said interconnecting means is accessible from outside said housing.

9. A construction as defined in claim 1 wherein said second housing member and said interconnecting member are provided with opposed sockets adapted to receive and confine said motor field, and resilient means in one of said sockets engaging said field and bias it into snug seating relation with the other of said sockets.

10. A construction as defined in claim 5 wherein said screw means extends through said motor field.

11. A construction as defined in claim 1 which includes a base adapted to rest on a work surface, said base having an upstanding leg disposed adjacent said housing, means adjustably interconnecting said leg and said housing for relative movement along the axis of rotation of said armature, said armature including a shaft extending through said first housing member and adapted for connection to a tool bit, said base having an aperture aligned with said shaft whereby to permit access to said work surface by said tool bit.

12. A construction as defined in claim 11 which includes elongated means secured to said housing and slidably disposed in a slot formed in said base leg, and means for releasably clamping said base leg and said elongated means.

13. A construction as defined in claim 12 wherein said elongated means is secured to said housing sleeve.

14. A construction as defined in claim 12 wherein said elongated means includes a generally T-shaped cross-sectional bar, a rack secured to said bar, said base leg having portions slidably secured between said bar and said housing sleeve, a pinion rotatably carried by said base leg and engageable with said rack.

15. A construction as defined in claim 14 wherein said clamping means includes generally C-shaped member carried by said base leg and slidably embracing said bar, and means connected to said member for drawing said member tightly against said bar to clamp said housing in selected adjusted positions relative to said base leg.

References Cited

UNITED STATES PATENTS

| | | | |
|---|---|---|---|
| 1,046,075 | 12/1912 | Kelley | 144—136 |
| 2,694,157 | 11/1954 | Cone | 310—58 |
| 2,842,173 | 7/1958 | Turner et al. | |
| 2,855,963 | 10/1958 | Potter | 144—134 |
| 2,970,233 | 1/1961 | Penney | 310—63 |
| 3,078,805 | 2/1963 | Pezzillo | 310—62 X |

WARREN E. RAY, *Primary Examiner.*

U.S. Cl. X.R.

144—134; 310—62, 91